(12) United States Patent  (10) Patent No.: US 8,413,164 B1
Jensen-Fellows et al.  (45) Date of Patent: Apr. 2, 2013

(54) PRESENTING AN INTERFACE TO A COMPUTER SYSTEM FOR USE IN CONDUCTING DIAGNOSTIC TESTS

(75) Inventors: Simon Jensen-Fellows, Acton, MA (US); Michael D. Miles, Millis, MA (US)

(73) Assignee: EMC Corporation, Hopkinton, MA (US)

( * ) Notice: Subject to any disclaimer, the term of this patent is extended or adjusted under 35 U.S.C. 154(b) by 881 days.

(21) Appl. No.: 12/495,296

(22) Filed: Jun. 30, 2009

(51) Int. Cl.
*G06F 3/00* (2006.01)
*G06F 12/00* (2006.01)
(52) U.S. Cl. .......................... 719/310; 711/4
(58) Field of Classification Search .............. 719/310; 711/4
See application file for complete search history.

(56) References Cited

U.S. PATENT DOCUMENTS

| | | | |
|---|---|---|---|
| 6,553,223 B1 * | 4/2003 | Bayley et al. | 455/419 |
| 7,003,780 B2 * | 2/2006 | Peloquin et al. | 719/321 |
| 7,051,198 B2 * | 5/2006 | Cabrera et al. | 713/100 |
| 7,925,829 B1 * | 4/2011 | Michael et al. | 711/114 |
| 2006/0200821 A1 * | 9/2006 | Cherkasova et al. | 718/1 |
| 2010/0095310 A1 * | 4/2010 | Oshins | 719/327 |

OTHER PUBLICATIONS

Wayne M. Cardoza, Design of the TruCluster Multicomputer System for the Digital UNIX Environment, 1996.*

* cited by examiner

*Primary Examiner* — Lechi Truong
(74) *Attorney, Agent, or Firm* — Guerin & Rodriguez, LLP; Michael A. Rodriguez

(57) ABSTRACT

A system and method for performing diagnostics on a computer system having a plurality of physical hardware devices includes associating a logical device with a physical hardware device of the computer system. The logical device is provided with a programmatic interface that abstractly reproduces a functionality of the physical hardware device associated with the logical device and insulates the logical device from device-specific particulars needed to communicate with the physical hardware device. The logical device is associated with a translator that is capable of communicating with the physical hardware device associated with the logical device using the device-specific particulars needed to communicate with that physical hardware device.

18 Claims, 11 Drawing Sheets

PRESENTING AN INTERFACE TO A COMPUTER SYSTEM FOR USE IN CONDUCTING DIAGNOSTIC TESTS

FIELD OF THE INVENTION

The present invention relates generally to diagnostic testing of computer systems. More particularly, the present invention relates to programmatically presenting an interface to a computer system for use by application programs.

BACKGROUND

The Open System Interconnection (OSI) reference model provides a conceptual framework for networking communications. The OSI reference model divides communications into seven layers, the topmost or seventh layer being the application layer. In general, the application layer provides an interface to user processes. For example, a test application program, running in an operating system environment, typically communicates with the application layer, but cannot interface with any of the other host layers, such as the Presentation, Session, and Transport layers. Communications, according to the OSI model, pass up or down from layer to the next layer.

The OSI model, however, presents a disadvantage to diagnostic testing. A primary objective of the OSI model is to achieve successful communication between networking hosts; the OSI model concerns itself with successful, accurate data transmission. To achieve this aim, the OSI layers may employ error recovery mechanisms. As long as the communications are successful, the recoverable errors can remain unreported.

Moreover, interactions with the host layers of the OSI model do not necessarily result in predictable or deterministic results in the media layers, namely, the Network, Data Link, and Physical layers. Yet predictable or deterministic results are essential for test or diagnostic purposes. For example, the host layers cannot create faulty data packets or precisely control the timing of physical layer interactions. In addition, the protocol restricts the manner by which the host layers handle data transmission over shared media.

Another approach to diagnostic testing involves directly acting on the physical hardware device itself. To some extent, the interaction with the physical device may involve reproducing relevant portions of the OSI model in order to exercise the functionality of the physical device. In such instances, the aforementioned criticism comes back into effect. Otherwise, the diagnostic testing manipulates the physical device in raw fashion. Irrespective of whether the diagnostic software tests the physical device indirectly through an OSI layer or directly through direct control, it is still problematic that the diagnostic software treats the physical device as a separate, single component in a computer module. Often, for diagnostics purposes, it is more desirable to treat and test the computer module as a functional whole.

A variation of this approach is to conduct diagnostic tests through an interface provided by a software driver. However, the interfaces of typical software drivers are usually designed to fit into the OSI model. Further, such software drivers manage individual physical devices on system buses, rather than individual functions on multipurpose devices.

SUMMARY

In one aspect, the invention features a method for performing diagnostics on a computer system having a plurality of physical hardware devices. The method comprises associating a logical device with a physical hardware device of the computer system. The logical device is provided with a programmatic interface that abstractly reproduces a functionality of the physical hardware device associated with the logical device and insulates the logical device from device-specific particulars needed to communicate with the physical hardware device. The logical device is associated with a translator that is capable of communicating with the physical hardware device associated with the logical device using the device-specific particulars needed to communicate with that physical hardware device.

In another aspect, the invention features a computer system comprising a plurality of physical hardware devices. A computer readable storage medium stores computer readable program code for performing diagnostics on the computer system. A processor executes the computer readable program code to: associate a logical device with a physical hardware device of the computer system; provide the logical device with a programmatic interface that abstractly reproduces a functionality of the physical hardware device associated with the logical device and insulates the logical device from device-specific particulars needed to communicate with the physical hardware device; and associate the logical device with a translator that is capable of communicating with the physical hardware device associated with the logical device using the device-specific particulars needed to communicate with that physical hardware device.

In yet another aspect, the invention features a computer program product for performing diagnostics on a computer system. The computer program product comprises a computer readable storage medium having computer readable program code embodied therewith. The computer readable program code comprises computer readable program code configured to associate a logical device with a physical hardware device of the computer system, computer readable program code configured to provide the logical device with a programmatic interface that abstractly reproduces a functionality of the physical hardware device associated with the logical device and insulates the logical device from device-specific particulars needed to communicate with the physical hardware device, and computer readable program code configured to associate the logical device with a translator that is capable of communicating with the physical hardware device associated with the logical device using the device-specific particulars needed to communicate with that physical hardware device.

BRIEF DESCRIPTION OF THE DRAWINGS

The above and further advantages of this invention may be better understood by referring to the following description in conjunction with the accompanying drawings, in which like numerals indicate like structural elements and features in various figures. The drawings are not necessarily to scale, emphasis instead being placed upon illustrating the principles of the invention.

DETAILED DESCRIPTION

Figure 1:
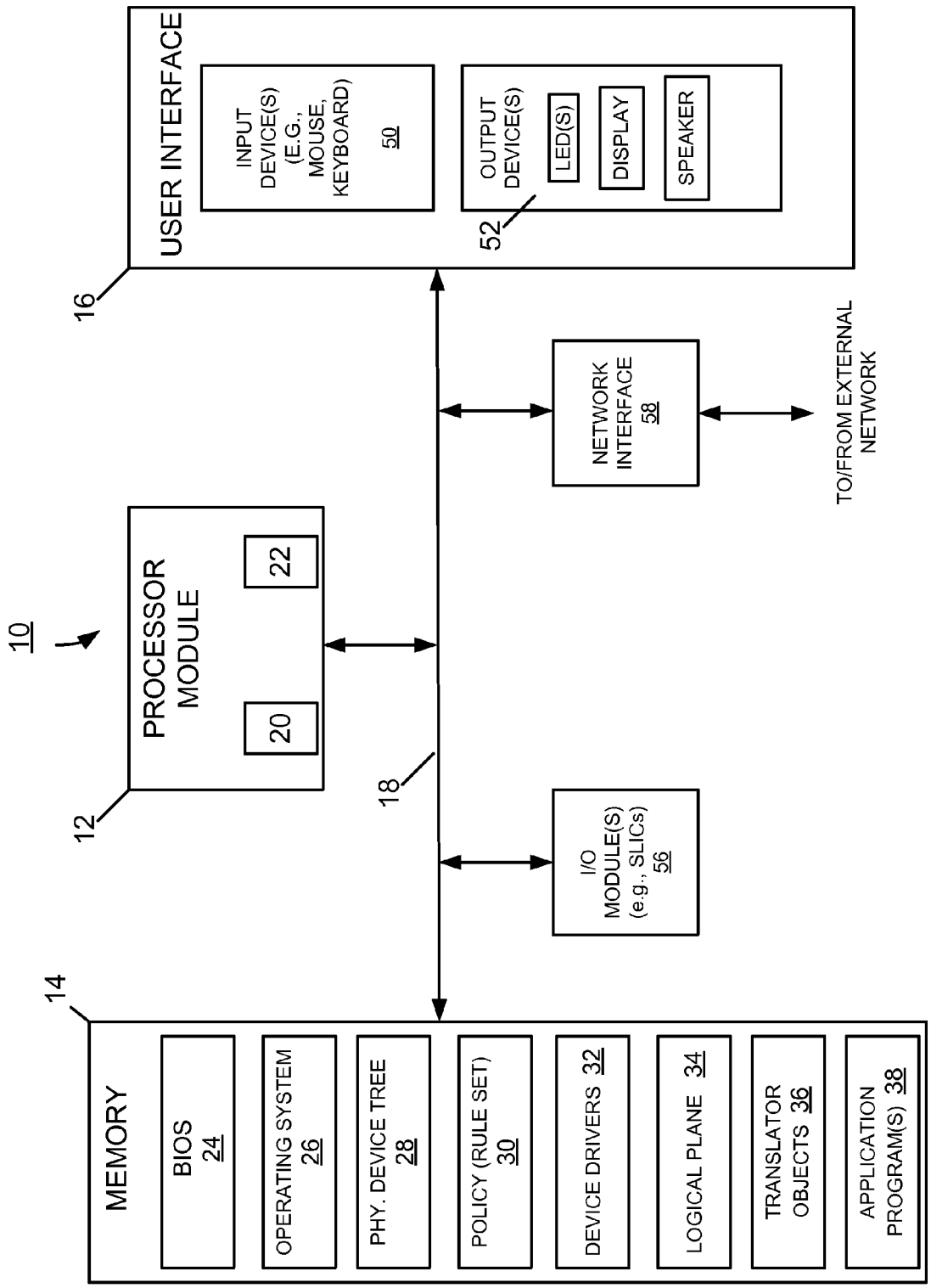
FIG. 1 is a block diagram of an embodiment of a computer system that can be used to practice the invention.

Computer systems, described herein, employ application program interfaces (APIs), embodied by logical devices, and device driver "slices" that are particularly suited for use by diagnostic and test applications. Through such programmatic objects, test applications are able to test and exercise modular groups of electronic devices of a computing system as a whole, independently of the physical topology of the computer system.

In brief overview, a computer system treats physical hardware devices as bus-class devices. Each bus-class device provides a programming interface appropriately adapted to the type of hardware bus to which that bus-class device is connected. Examples of hardware buses for which a bus-class device can provide a bus-class programming interface include PCI (Peripheral Component Interconnect) buses, USB (Universal Serial Bus) buses, and I2C (Inter Integrated Circuit) buses. During initialization of the computer system, the physical devices become known, and the operating system builds a physical device tree representing the physical topology of the computer system.

Based on those physical devices discovered in the computer system, the computer system constructs programmatic objects called logical devices. The construction of such logical devices occurs in accordance with a policy. As used herein, the term policy refers to information or knowledge about a computer system not programmatically discoverable from the physical topology of the computer system. Such information or knowledge is considered external to the computer system, because the acquisition of such knowledge comes from a source external to the computer system, such as a programmer who embodies the knowledge in program code.

As an example of such external information, the operating system may discover a Fibre Channel (FC) device in the computer system, and place it in the physical device tree. However, the operating system does not have the information needed to recognize that the FC device controls another component that is generally not discoverable, such as an LED. To recognize the relationship between the FC device and the LED, such information needs to be supplied to the computer system, and such information is referred to as policy. Policy helps interpret the presence of an undiscovered physical device (e.g., the LED) and generate a logical device based upon that physical device. Accordingly, policy can lead to implicit logical devices, that is, logical devices that do not have a discoverable counterpart in the physical device tree.

In this example, the LED is not discoverable, policy helps interpret the physical device topology to infer that the logical function of "indication" exists. That is, policy enables construction of a logical topology that is completely independent of the physical topology: the LED functionality is logically a child function of a logical I/O device. The actual underlying physical implementation of the LED is immaterial; the LED could be physically a child function of the FC PCI device, or a separate I2C device altogether. The particular physical implementation is immaterial because both physical topologies can be accommodated by rewriting policy, without needing to change the program code for the logical I/O device.

In general, a policy is embodied as a set of rules that defines the logical devices that may result from the discovery of the physical devices of a computing system. The definition of a given logical device is in terms of other logical devices, if any, that are contained within that logical device. Each logical device is a programmatic object containing zero, one, or more other logical devices, and the algorithms (i.e., methods, procedures) that control the interaction of the logical devices contained within that logical device.

For test purposes, a logical device is an entity that can be tested as a whole. Because a logical device is a grouping of logical devices (which correspond to a group of underlying physical devices), testing a logical device is, in effect, equivalent to testing a group of logical devices together, that is, as a single entity represented by the logical device.

Another use for policy is to verify whether a discovered arrangement of physical hardware devices in a computer system corresponds to a valid configuration. For example, although a particular arrangement of interface cards found in a given computer system may be physically and electronically viable, this configuration may actually not be permitted (e.g., it may not correspond to any particular system offered by the supplier, or it may correspond to an incorrect configuration for a given model of computer system). Policy, then, can verify configurations found during diagnostics.

Each logical device provides a functional interface for testing the functionality of the computer system and its various components. A functional interface may be highly abstract, and need not correspond to any physical bus-class interface. For example, a functional interface can include a "toggle indicator lamp" function, or a "transmit this arbitrary data to a certain target" function. The functionality of a given logical device becomes increasingly abstract as the grouping of logical devices contained within that logical device becomes larger.

Conversely, the functionality becomes more specific (less abstract) as the logical device grouping becomes smaller. Ultimately, the services of physical devices must provide the functionality. Programmatic objects, called translators, provide the interaction with the physical devices, serving as intermediaries between the logical devices and physical devices. Hence, a logical device manipulates its corresponding underlying physical device or devices through one or more translators. Each translator obtains a service from an underlying physical device by communicating through the bus-class interface of the physical device, being adapted to provide the protocol and device-specific command and control, and provides a function to the logical device by communicating through the functional interface of the logical device. Accordingly, logical devices do not access bus-class interfaces; the translators operate to keep the logical devices separate from the details of the underlying physical implementation.

Advantageously, removing dependence on explicit physical devices makes test code reusable, as described in more detail below. Logical devices can be reused independently of the underlying data protocols. Support for new physical devices can be implemented reusing translator components for existing services, or retargeting the translator components to the details of the specific hardware implementation of the new physical device. Such code reuse simplifies the engineering process needed to support new physical devices and logical devices.

Another advantage of the computer systems described herein is that a test application can control those physical devices that are actually found in the computer system, through the logical devices based on those physical devices. This is a departure from conventional diagnostics that employ test applications written based on the physical devices that are expected to be present in the computer system. In such conventional diagnostics, if the system-under-test contains unexpected physical devices, the test application may be unable to test them.

Depending on the purpose of a particular test, the implementer of the test can chose a functional interface of a logical device at the appropriate degree of abstraction. If a test requires interaction with bus-class features of a physical device, the physical device tree provides a bus-class interface to the physical device. For example, a test may seek to read the PCI configuration registers of a device. For this test, it would be appropriate to use the physical device tree. In contrast, a test seeking to perform an internal loopback test on an I/O device conducts the test through the exercise of the corresponding logical device.

Thus, the test writer can interface with either the logical or the physical layer. Functions are provided by the logical layer, whereas the physical devices provide only the bus-class interfaces. In the instance of the physical layer, the test writer needs some special knowledge in order to interpret the results. Thus, to read a register in the physical layer, the test writer must know the meaning (or purpose) of that register, (for example, the hex value in the register corresponds to a particular "error status". In contrast, at the logical layer, the interface is functional. An external method of the functional interface can be "Get_Error_Status( )", and the method can return a string "Buffer overflow"—in other words, the logical device interprets the value returned from reading the specific register, and synthesizes the textual meaning of the error code.

FIG. 1 shows a simplified block diagram of an embodiment of a computer system 10 that can be used to practice the invention. The computer system includes a processor module 12, memory 14, and a user interface 16 in communication over a bus 18. Example embodiments of the computer system 10 include, but are not limited to, a personal computer (PC), a Macintosh computer, a workstation, laptop computer, a mainframe computer, a hand-held device such as a personal digital assistant (PDA) and a cellular phone, a network terminal, a storage system, a blade server, and a server system.

The processor module 12 includes one or more processors 20 and components 22, also referred to herein as hardware, physical devices, and physical hardware devices. Examples of such components include, but are not limited to, a memory controller hub device, a protocol bridge (e.g., a PCI Express™ switch), and logic circuitry (e.g., local memory, registers, an input/output (I/O) controller hub device, a general-purpose I/O device (GPIO), a super I/O device (SIO)).

The memory 14 includes read-only memory (ROM) and random-access memory (RAM) for storing various types of program code, including a BIOS 24, an operating system 26, a physical device tree 28, a set of rules 30 related to a policy, device drivers 32, the logical plane 34, translator objects 36, and application programs 38. Basic routines used to transfer information between the components of the computer system 10 at certain times, such as during startup, are included in the basic input/output operating system (BIOS) 24 in ROM. The BIOS 24 provides an interface between the operating system 26 (e.g., WINDOWS XP, PALM OS, Mac OS, LINUX, UNIX) and the specific hardware configuration of the computer system, including the processor module 12 and the memory 14.

The user interface 16 includes input devices 50 (e.g., mouse, keyboard, touchpad, touch-screen, trackball) by which user-supplied commands and information enter the computer system 10, and output devices 52, for example, a display, speakers, or light indicators (e.g., LEDs), convey information to the user.

The bus 18, as shown in FIG. 1, is not a single bus connected to every component of the computer system 10; rather, it is representative of a system of buses that interconnect the various components. Examples of buses that may be part of the system of buses include, but are not limited to, a memory bus, an I2C bus, a USB bus, and a PCIe bus.

The computer system 10 includes other components, for example, input/output modules 56 for communicating with one or more disk drives (hard drives, magnetic drives, optical drives, and the like) that can provide non-volatile storage of computer readable instructions, data structures and other data, and a network interface 58 for communicating with an external network, for example, a LAN, WAN, the Internet.

Figure 2:
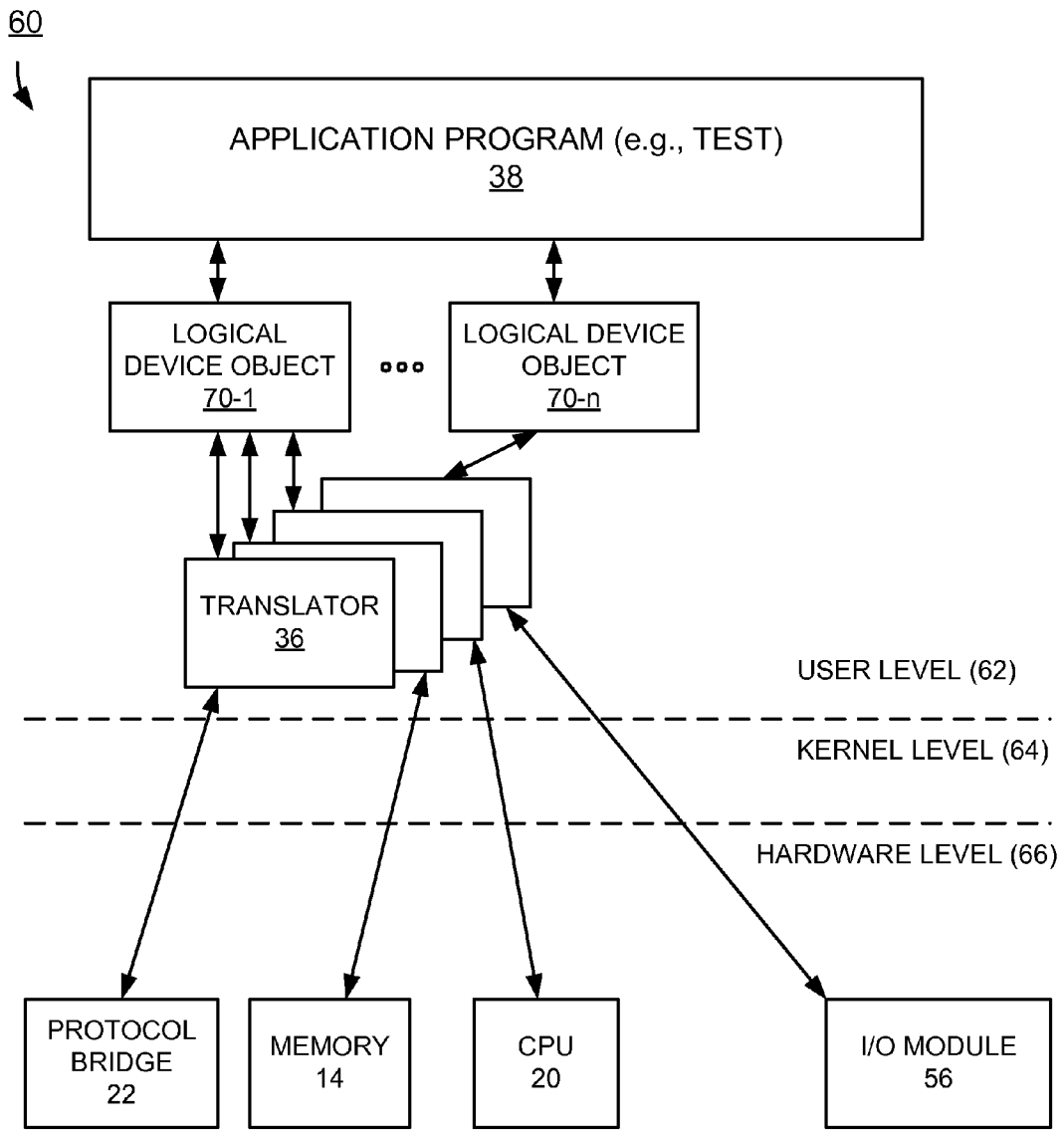
FIG. 2 is a block diagram of an embodiment of a software system of the computer system.

FIG. 2 shows an embodiment of a software system 60 of the computing system 10, including a user level 62, a kernel level 64, and a hardware level 66. At the user level 62 are various programmatic objects, as described below. One type of programmatic object is the translator or translator object 36. A translator 36 can be considered to be a "slice" or subset of a device driver; whereas a device driver provides a set of functions for managing a physical device (e.g., receive data, prepare data, transmit data), a translator provides a specific I/O function (e.g., transmit data only). A translator also provides an interface by which program code can interface with the physical device to perform its specific function. Here, the program code is another type of programmatic object that is loaded into the kernel, called logical device objects 70, 70-n (generally, 70). The translators insulate the logical device objects 70 from the particulars of the physical devices.

In brief, each logical device object 70 is a group of functions that can be called by the test application 38. Because a given logical device can encompass a group of logical devices, the effect of testing the logical device is to test the logical devices in the group as a whole (as a single entity). This grouping of functions enables a user to exercise the system-under-test in a manner that coincides with the user's understanding of the system. The user can test, together as logical systems, physical devices that have no physical commonalities. In addition, the program code of the test application does not need to manage individual electronic physical devices that provide multiple services as single entities. Rather, the program code can work with the functions provided by the individual services on that physical device.

Although shown in FIG. 2 to be implemented at the user level, in another embodiment, the logical device and translator objects can be implemented as kernel services at the kernel level.

Figure 3:
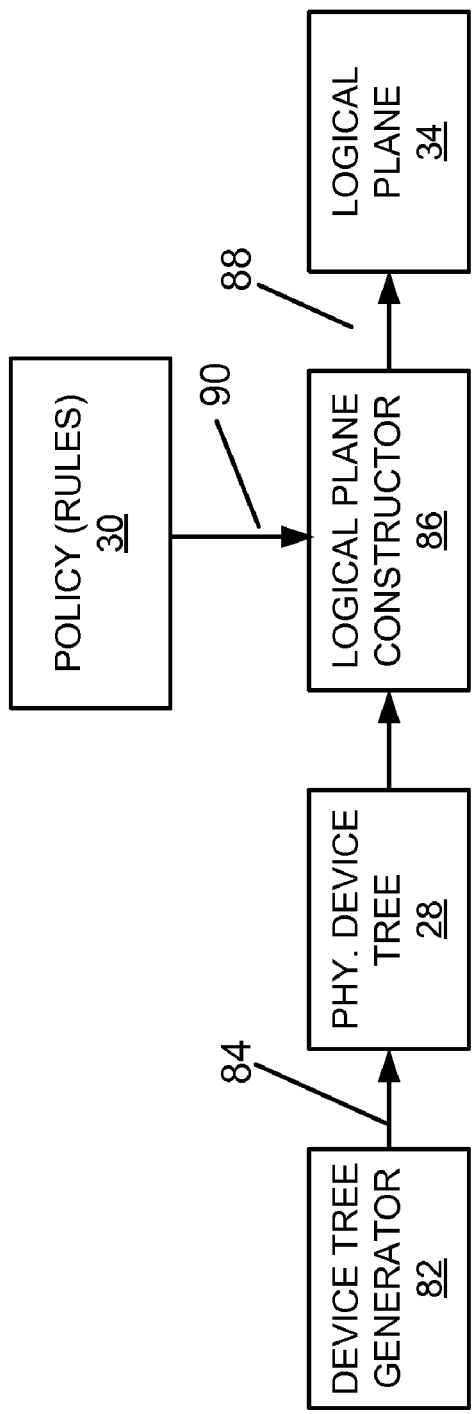
FIG. 3 is a block diagram of a process by which logical devices are identified for the computer system.

FIG. 3 illustrates an embodiment of a process 80 by which the computer system 10 constructs a logical plane 34 for the computer system 10. In the description of the process 80, reference is also made to features of FIG. 1 and FIG. 2. Upon initialization, the processor module 12 accesses firmware, for example, the BIOS 24. After the operating system initializes, the operating system calls a device tree generator 82, which produces (step 84) a physical device tree 28 comprised of physical hardware devices that have identified themselves during initialization and with other known physical hardware devices. The resulting physical device tree 28 is a hierarchical tree that represents the hardware topology of the computer system 10. In one embodiment, the device tree generator 82 is program code residing at the user level 62. Alternatively, the program code of the device tree generator 82 can be embodied in the firmware.

A logical plane constructor 86 begins at the root node of the physical device tree 28 and constructs (step 88) the logical plane 34 comprised of logical device objects 70, also referred to as logical devices. In the construction of the logical plane 34, the logical plane constructor 86 refers (step 90) to a set of rules 30 corresponding to the policy governing the identification of logical devices in the computer system. In one embodiment, an XML file stored in memory 14 holds the set of rules 30.

In a similar manner to the way the physical device tree organizes physical devices, the logical plane 34 can arrange the logical devices 70 in a hierarchical tree. In addition, in one embodiment, the logical plane constructor 86 searches for, among the translators installed on the computer system, those translators that are to be used by the logical devices. In general, for a given logical device, the logical plane constructor seeks a translator with two features: 1) it can provide the functionality of the logical device; and 2) it can communicate with the particular type of underlying physical device. In another embodiment, the translators are explicitly encoded in the policy. The logical plane constructor 86 adds the translators to the logical plane (e.g., as leaf nodes in the hierarchy of logical devices), in effect, binding (or mapping) the logical devices to the translators. This mapping enables application programs to control physical devices through calls to logical devices; in response, the logical devices call those translators to which the logical devices are mapped, and the translators manipulate the physical devices.

After construction of the logical plane, one physical device might be associated with several logical devices. For example, a single PCI physical device can have four functions (i.e., services), each of which can be represented by a different, independent logical device. In addition, a single logical device can operate on multiple physical devices or on no physical devices if the logical device contains children logical devices. Further, whereas each translator can communicate with only one physical device and with only one logical device, there can be multiple translators for a given physical device and multiple translators for a given logical device.

Figure 4:
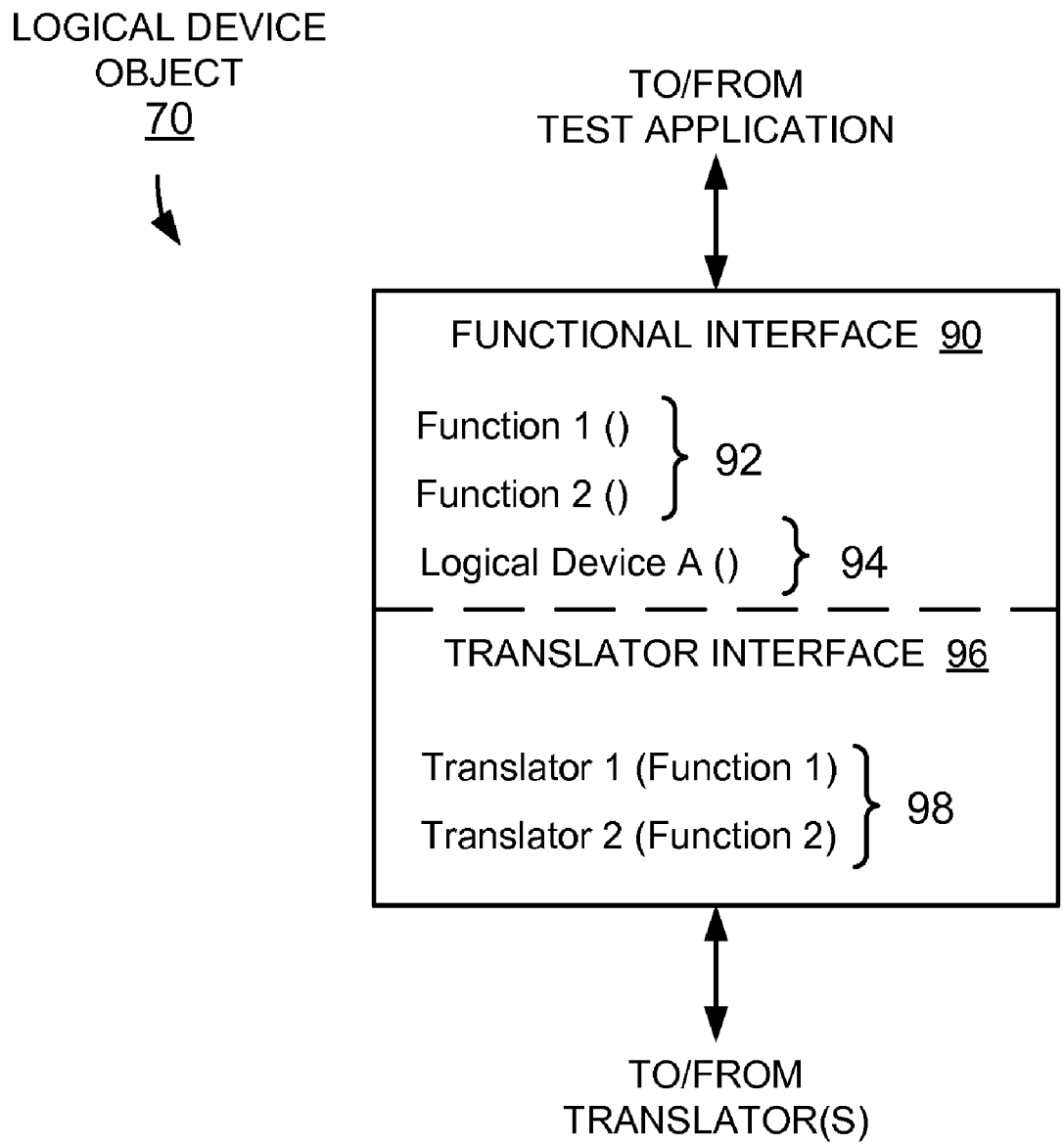
FIG. 4 is a diagram of an embodiment of a generic logical device object.

FIG. 4 shows an embodiment of a logical device object 70 that may be identified in the computer system 10. The logical device object 70 includes a functional interface 90 comprised of one or more high-level functions 92 that correspond to the functionality of the represented logical device. Such high-level functions can also be thought of as methods, procedures, calls, or routines. The functional interface 90 can also include one or more functions 94 for calling one or more other logical devices, namely, those that fall within the definition of and are contained by this logical device. In general, the test application 38 uses the functions 92 and 94 to control the interactions among the logical devices contained within the single logical device.

The logical device object 90 may also have a translator interface 96 comprised of one or more functions 98 for calling particular translators 36 in order to exercise the physical devices underlying the logical device. As an illustrative example, this logical device object 70 can be adapted to call translator 1 when the test application calls function 10, and adapted to call translator 2 when the application calls function 20. Not all logical devices have an interface to a translator. For example, a logical device defined as a group of other (child) logical devices does not have a translator interface. Instead, one or more of the child logical devices can have a translator interface. Thus, some logical devices have only an interface to the functional interface of their children logical devices. Thus, the functionality of the parent logical device is increased by aggregating the functionality of the children logical devices.

Figure 5:
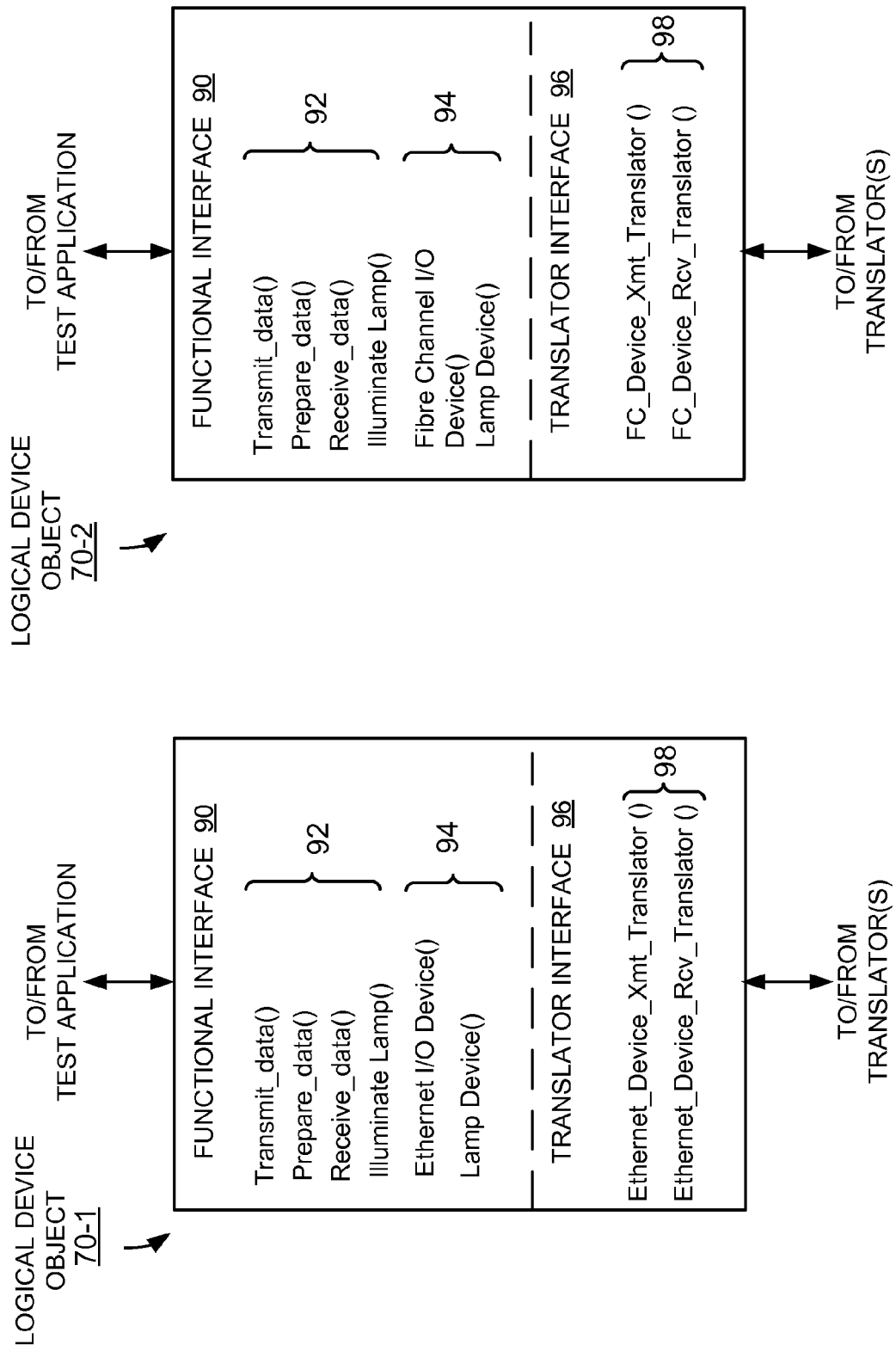
FIG. 5A is a diagram of an example of a logical device object for an I/O module that communicates in accordance with Ethernet protocol.
FIG. 5B is a diagram of an example of a logical device object for an I/O module that communicates in accordance with a Fibre Channel protocol.

FIG. 5A and FIG. 5B show two examples of logical device objects 70-1, 70-2. For example, consider that the computer system 10 includes various types of small interface cards referred to herein as SLICs. Typically, a SLIC includes a hardware device for communicating over a data network or with a data storage device. In addition, a SLIC includes an indicator lamp to indicate the status of communication over the data network or with the data storage device. In the logical plane 34, a SLIC is identified as a logical device containing two other logical devices: an indicator device and an I/O device.

In addition, the I/O devices of two different SLICs may implement different communication protocols, for example, Ethernet and Fibre Channel. In addition, the indicator lamps of different types of SLICs can have different means for controlling the indicator lamps. For example, a SLIC based on the Fibre Channel protocol may use a general purpose Input/Output (GPIO) on a PCIe Fibre Channel device to control illumination of the indicator lamp, whereas a SLIC based with a PCIe SAS device may use an LED driver connected to an I2C bus to control the illumination of the indicator lamp.

Each of the logical device objects 70-1, 70-2 shown in FIG. 5A and FIG. 5B represents a SLIC; logical device object 70-1 represents a SLIC that includes an Ethernet device, and logical device object 70-2 represents a SLIC that includes a Fibre Channel device. If the LEDs 109-1, 109-2 serve to indicate activity transpiring over a network connection, a user of the computer system would recognize that a relationship exists between the LED and the network connection activity. In contrast, the physical topology of the computer system may not recognize or reveal any such relationship. The interfaces of the logical device objects 70-1, 70-2 enable the testing of seemingly disconnected devices as a whole, that is, as a single entity.

Some of the high-level functions 92 in the functional interface 90 of each logical device objects 70-1, 70-2 are the same for both logical device objects 70-1, 70-2, illustrating the reusability of program code. For example, the high-level functions 92 can include a transmit_data( ) function, a receive_data( ) function, a prepare_data( ) function, and an illuminate_lamp( ) function. Because a logical device is constructed independently of the underlying physical device, the program code of these various functions are reusable among SLIC logical devices.

A primary difference between the two SLIC logical device objects 70-1, 70-2 is the translators that are called to exercise the particular underlying physical devices (i.e., indicator device and I/O device). Logical device object 70-1 calls translators adapted to communicating with an Ethernet device, whereas logical device object 70-2 calls translators adapted to communicating with a Fibre Channel device.

Figure 6:
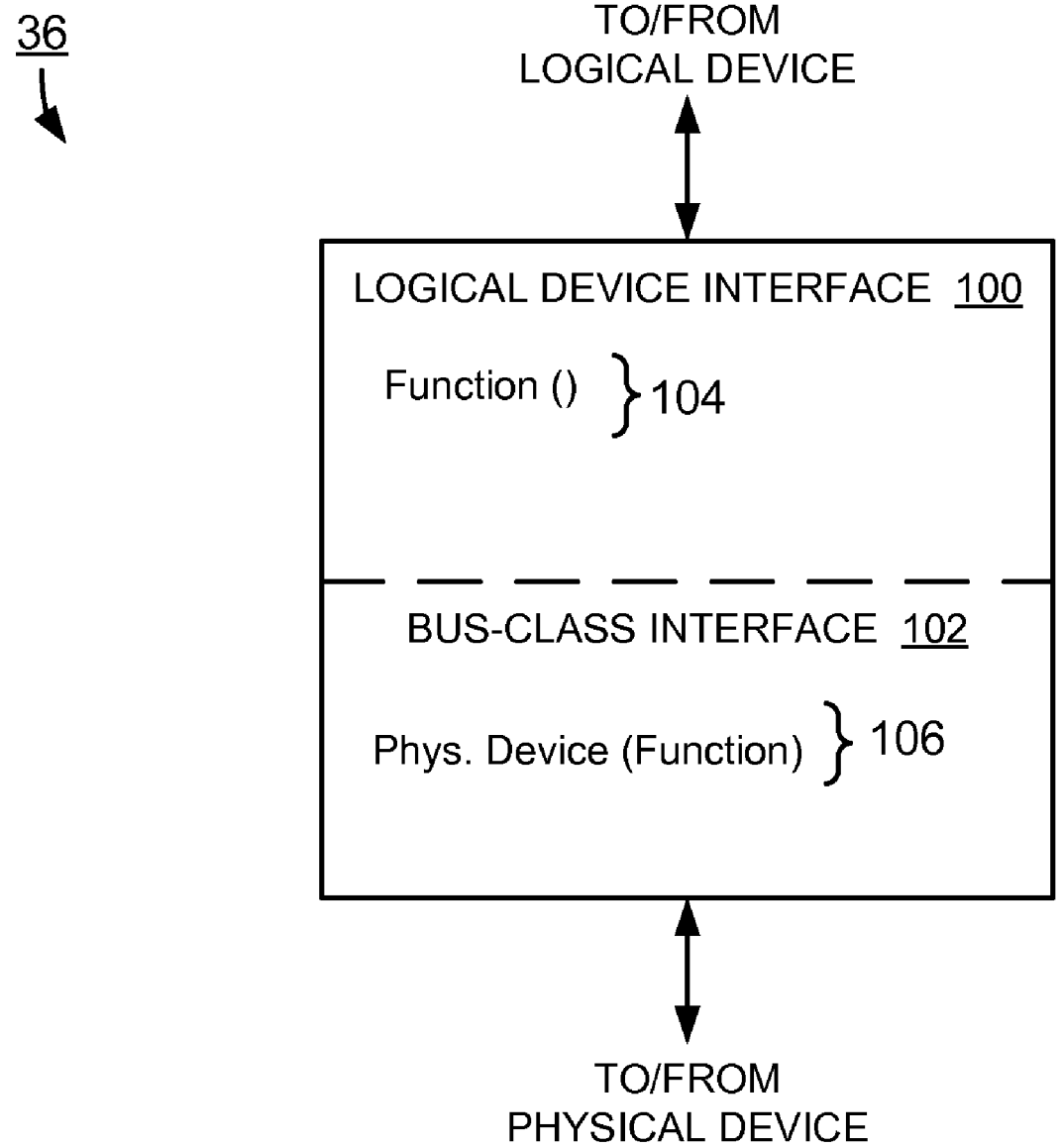
FIG. 6 is a diagram of an embodiment of a generic translator object.

FIG. 6 shows an example of a translator object 36 having a logical device interface 100 and a bus-class interface 102. In general, the logical device interface 100 provides an abstracted interface with one or more high-level functions 104 by which logical devices 70 communicate with the translator object 36. The bus-class interface 102 has one or more physical device functions specifically targeted to the particular underlying physical device with which the translator object 36 communicates in response to calls made to the high-level functions 104.

Figure 7:
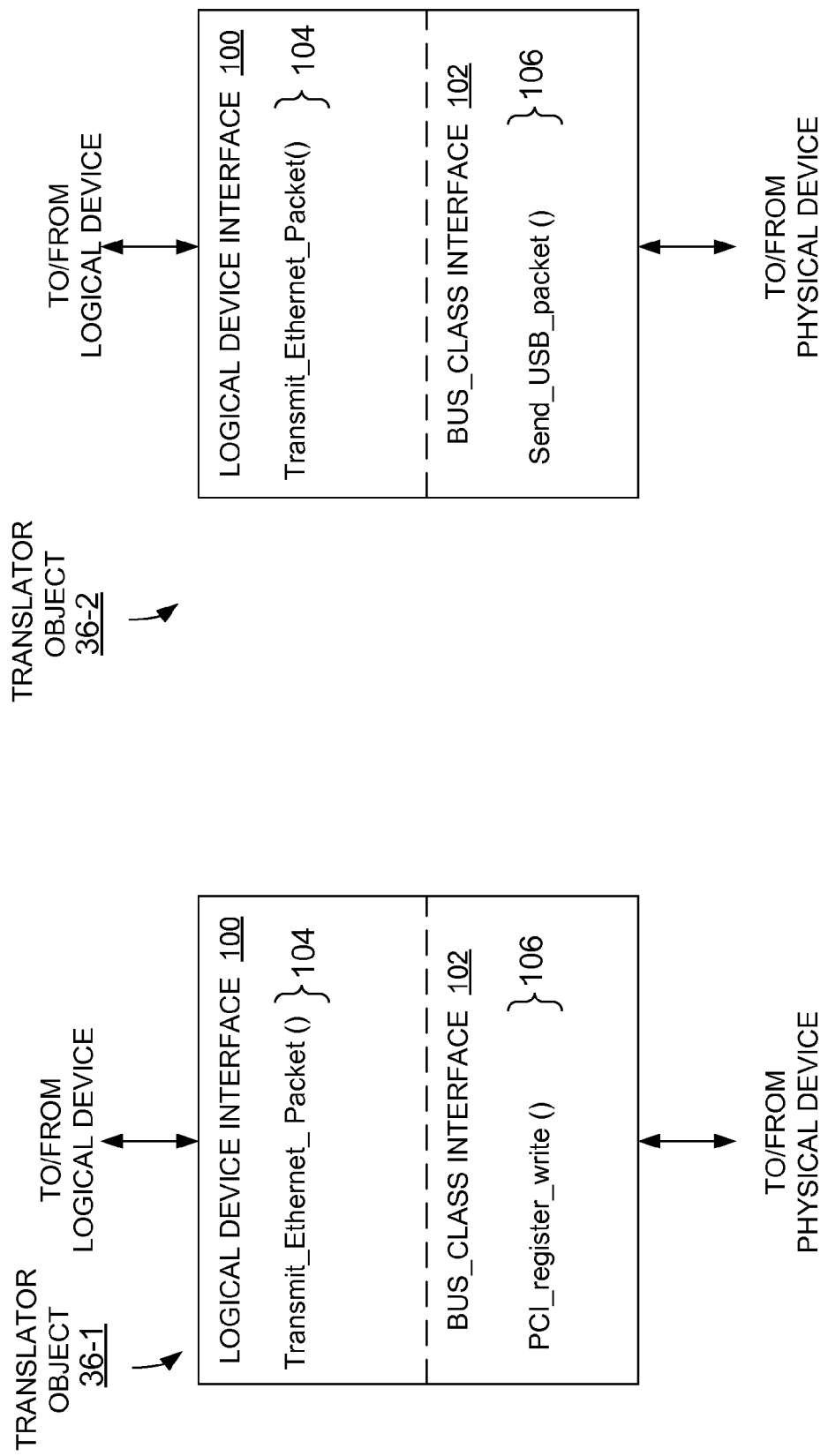
FIG. 7A is a diagram of an example of a translator object for communicating with an I/O module in accordance with the Ethernet protocol.
FIG. 7B is a diagram of an example of a translator object for communicating with an I/O module in accordance with the Fibre Channel protocol.

FIG. 7A and FIG. 7B show two examples of translator objects 36-1, 36-2. Both translators 36-1, 36-2 have a generic abstracted logical device interface 100 for transmitting data. Because different translators generally have different program code for communicating with different underlying physical devices, the bus-class interfaces 102 of the translators 36-1, 36-2 have different, device-specific functions. Here, when directed by a logical device, the translator object 36-1 communicates with a PCI device to transmit data (e.g., using a PCI_register_write( ) method). The translator object 36-2 communicates with a USB device to transmit data (e.g., using a Send_USB_packet( ) method).

The "transmit-data" translators 36-1, 36-2 illustrate program code reusability; the highly abstracted logical device interfaces 100 can use the same program code. Similarly, as additional illustrations, the logical device interfaces 100 of "receive-data" translators can reuse program code; and the logical device interfaces 100 can reuse program code. A difference between two "transmit-data" translators, or between two "receive-data" translators, is in their device-specific bus-class interfaces 102.

Figure 8:
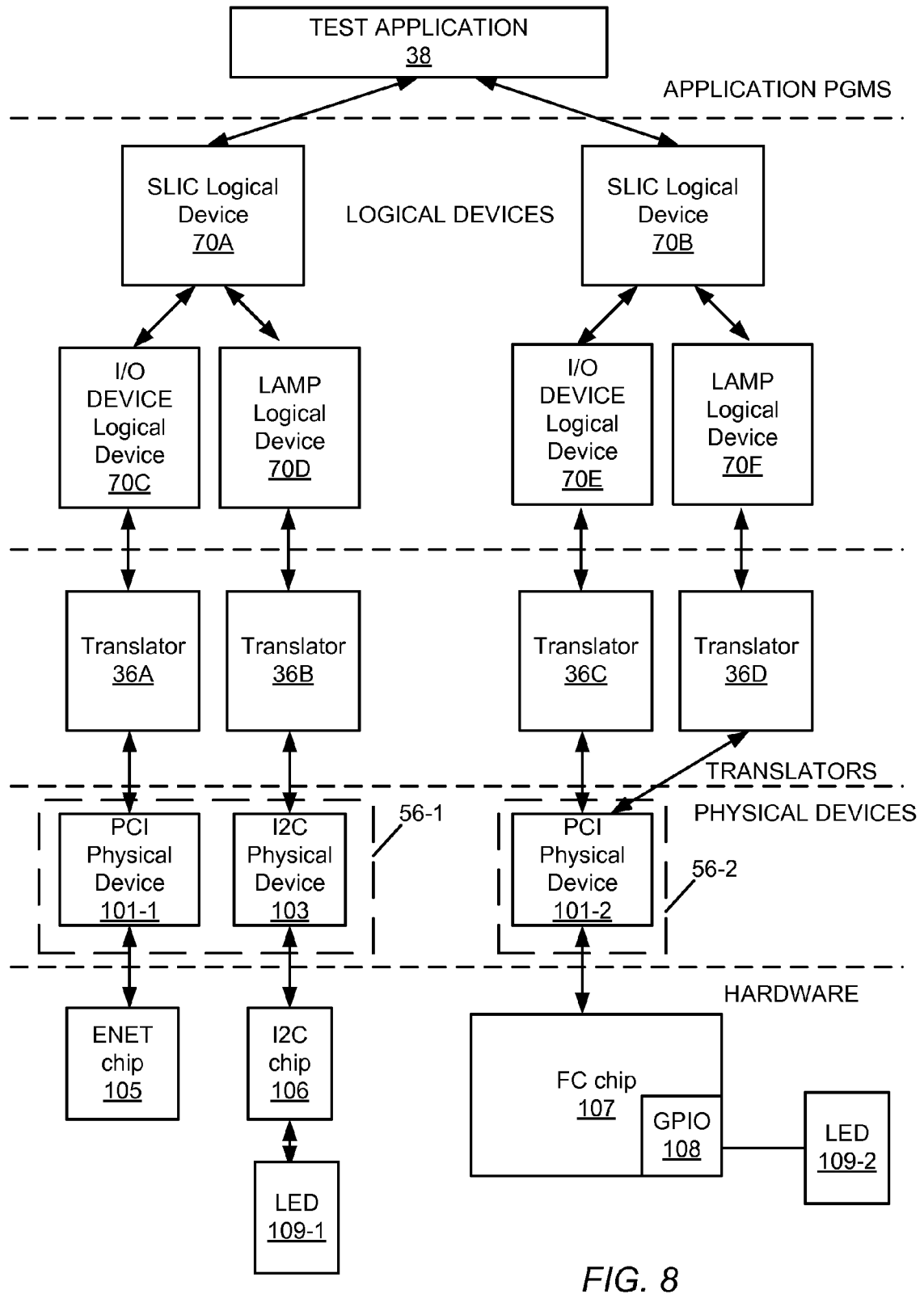
FIG. 8 is diagram of diagnostics system for testing two types of I/O modules through two sets of logical devices and translators.

FIG. 8 shows an embodiment of a diagnostics system employing logical devices and translators as described herein. The system includes a first SLIC physical device 56-1 having a PCI physical device 101-1 with an Ethernet chip 105 and an I2C physical device 103. The I2C physical device 103 includes an I2C chip 106 that is electrically connected to a lamp (LED 109-1) and drives illumination of this lamp. The system also includes a second SLIC physical device 56-2 having a Fibre Channel chip 107. The Fibre Channel chip includes a GPIO 108 that is electrically connected to another LED 109-2.

The logical devices include a first SLIC logical device 70A (associated with the SLIC physical device 56-1) and a second logical device 70B (associated with the SLIC physical device 56-2). Each of the SLIC logical devices 70A, 70B has two child logical devices: SLIC logical device 70A has an I/O device logical device 70C and a lamp logical device 70D; and SLIC logical device 70B has an I/O device logical device 70E and a lamp logical device 70F.

To test the first SLIC 56-1, a test application 38 calls a highly abstract function call of the functional interface 90 of the logical device 70A. For example, in response to an "illuminate the LED" function call, the SLIC logical device 70A calls the functional device interface 90 of the lamp logical device 70D. The lamp logical device 70D responds to the function call by communicating with the I2C device 103 through the translator 36B.

As another example, in response to a "transmit data" function call, the SLIC logical device 70A calls the functional device interface 90 of the I/O device logical device 70C. In response, the I/O device logical device 70C communicates with the PCI physical device 101-1 through the translator 36A. The translators 36A, 36B are adapted to communicate with their respective physical devices 101-1, 103 in order to control the behavior of the corresponding components; the translator 36A is adapted to control the I/O operations of the Ethernet chip 105, while the translator 36B is adapted to control illumination of the LED 109-1 via the I2C chip 106.

Testing the second SLIC 56-2 is similar to the testing of the first SLIC 56-1. The test application 38 again calls a highly abstract function call (for example, "illuminate the LED" or "transmit data") of the functional interface 90 of the SLIC logical device 70B. The program code for handling such function calls can be the same for both logical devices 70A, 70B. Depending upon the particular function call, the SLIC logical device 70B can call the functional device interface 90 of the I/O device logical device 70E or of the lamp logical device 70F. Again, to illustrate code reusability, the program code of the functional interfaces 90 of the I/O device logical device 70E can be the same as that of the I/O device logical device 70C, and the program code of the functional interfaces 90 of the lamp logical device 70F can be the same as that of the lamp logical device 70D.

In this example, both the I/O device logical device 70E and the lamp logical device 70F communicate with the PCI physical device 101-1; the I/O device logical device 70E, through the translator 36C, and the lamp logical device 70D, through the translator 36D. Each translator 36C, 36D converts received function calls into physical device-level operations through its bus-class interface 102. The translator 36C is adapted to control the I/O operations of the Fibre Channel chip 107, while the translator 36D is adapted to control illumination of the LED 109-2 via the GPIO 108 through the setting of bits in a PCI register on the Fibre Channel chip 107.

Figure 9:
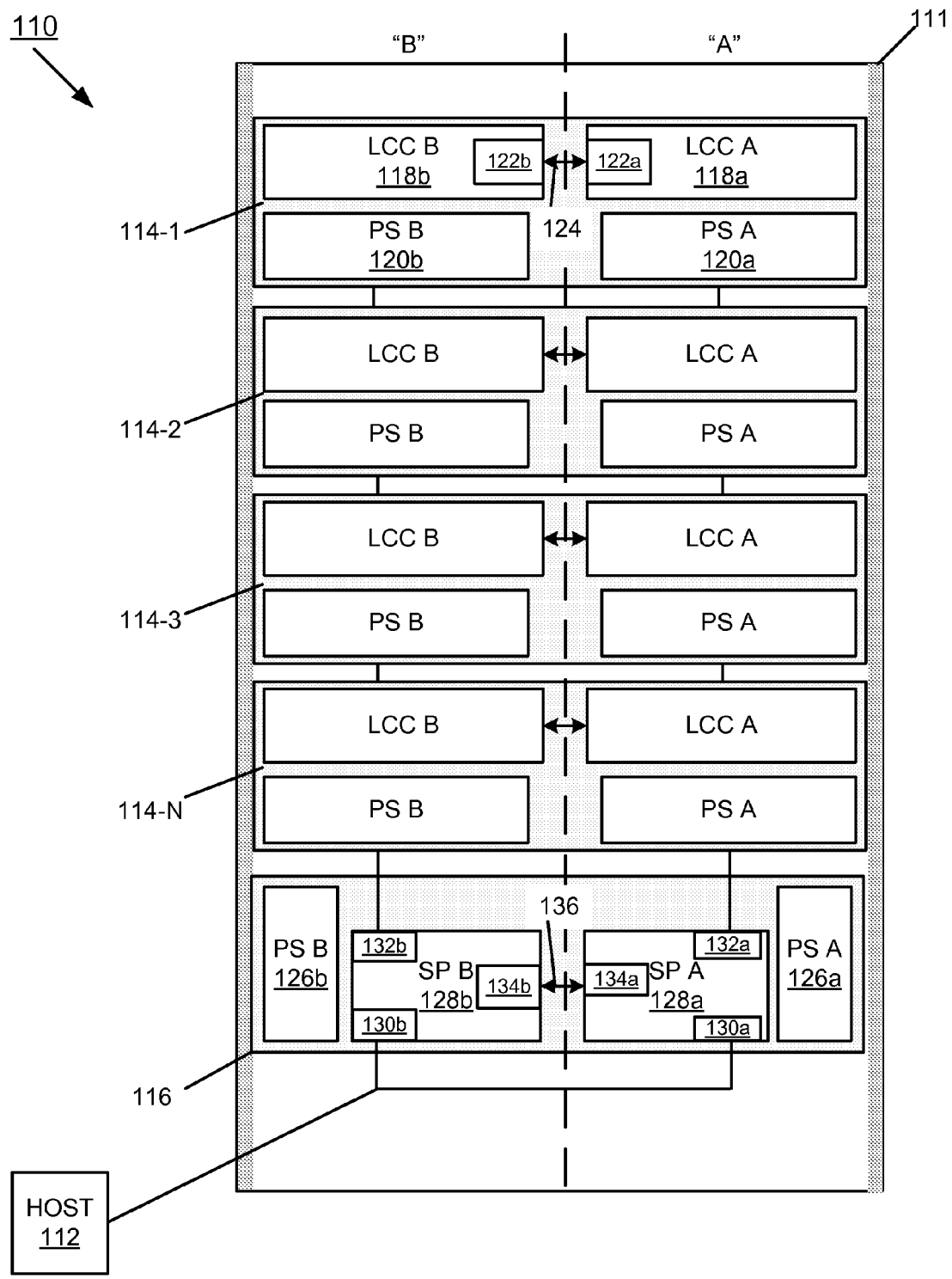
FIG. 9 is a block diagram of an embodiment of a storage system having a storage processor enclosure.

As an example of an embodiment of a computing system that can practice the invention, FIG. 9 shows a storage processor enclosure (SPE) 116 in a storage system 110. The system 110 includes a host system 112 in communication with a storage array 111. Exemplary implementations of the storage array 110 include Symmetrix® and CLARiiON® storage arrays, both produced by EMC Corp. of Hopkinton, Mass. The storage array 111 includes a plurality of enclosures, including disk array enclosures 114-1, 14-2, 114-3, 114-n (generally, DAE 114) in communication with the storage processor enclosure 116.

Each enclosure 114, 116 is partitioned into redundant halves: an "A" side and a "B" side. Each DAE 114 includes a plurality of physical disk modules (not shown) for storing data, a link control card (LCCA) module 118a, and power supply (PSA) module 120a on its A side, and a redundant link control card (LCCB) module 118b and redundant power supply (PSB) module 120b, on its B-side. Each link control card module 118a, 118b has a controller 122a, 122b respectively. The controllers 122 communicate over a bus 124.

The storage processor enclosure 116 includes a power supply (PSA) module 126a and storage processor (SPA) module 128a on its A side and a redundant power supply (PSB) module 126b and redundant storage processor (SPB) module 128b on its B side. Storage processor modules may also be known and referred to as storage processors, data movers, server blades, or just blades. Each storage processor module 128a, 128b (hereafter, processor module 128) includes a respective host adapter 130a, 130b for communicating with the host system 112, a respective disk adapter 132a, 132b, for communicating with the disks of the DAEs 114, and a respective controller 134a, 134b. The controllers 134a, 134b communicate with each other over a bus 136. Some embodiments of storage processor enclosures can also include disk modules and control card modules.

Figure 10:
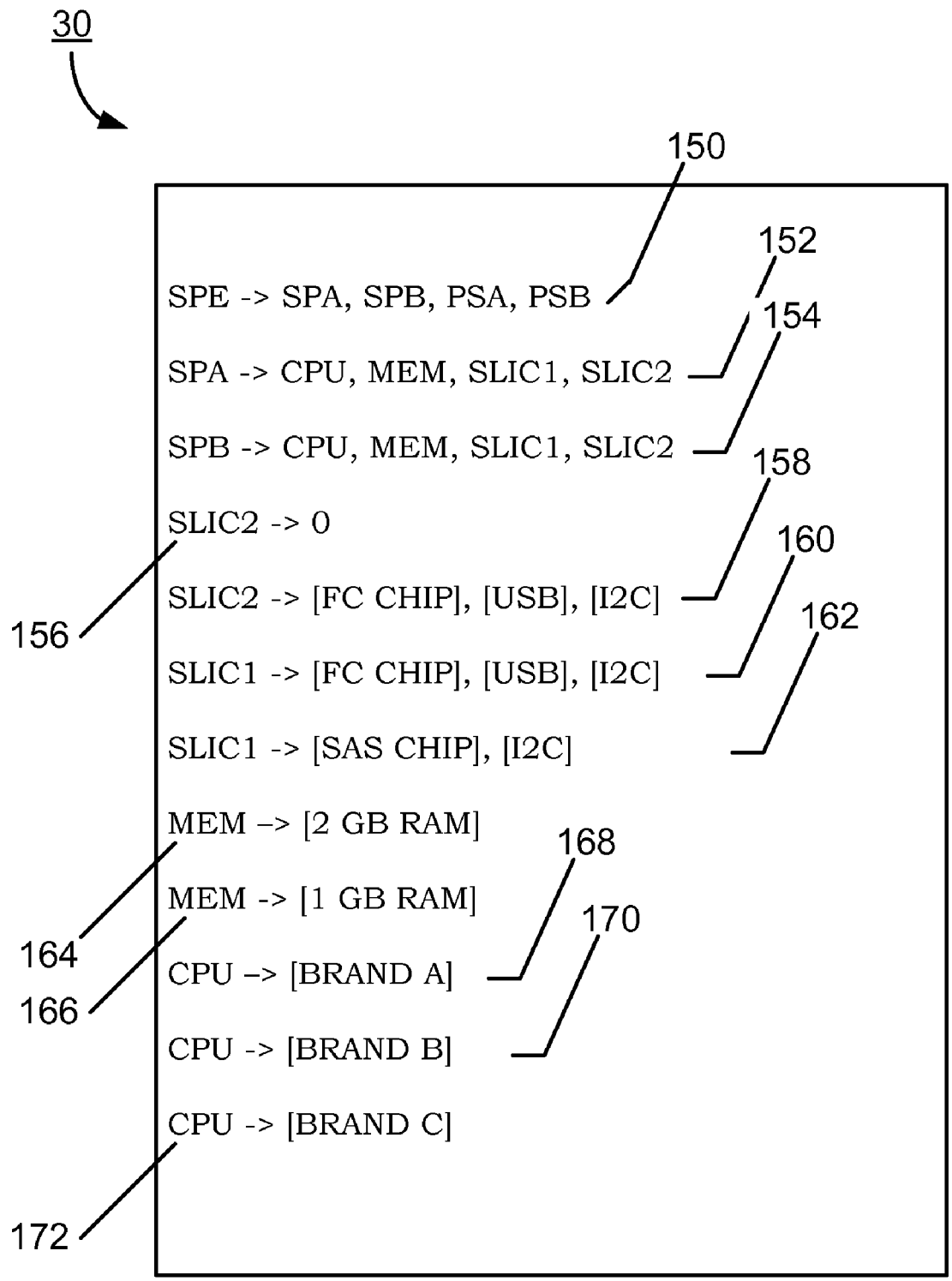
FIG. 10 is a diagram of a policy that can be utilized to identify logical devices associated with the storage processor enclosure.

FIG. 10 shows an example set of rules 30 that can be devised for the storage array of FIG. 9. A set of rules resembles a grammar, being comprised of "sentences" for identifying valid logical devices (that can be tested) based on the physical devices found in the computer system. The rules provide definitions for entire computer systems from the bottom up, starting with physical devices, grouping physical devices into logical devices, and grouping logical devices to produce increasingly abstract logical devices, until at least one rule represents an entire computer system as a set of logical devices. A policy (i.e., set of rules) can expand as desired to be inclusive of new types of physical devices and device configurations.

In this example, the rules 30 include a first rule 150 that defines an SPE logical device. The SPE logical device contains other types of logical devices, here, a storage processor (SPA), a redundant storage processor (SPB), a first power supply (PSA), and a redundant power supply (PSB). Two rules 152, 154 define the SPA and the SPB, each as a logical device containing a CPU device (CPU), memory (MEM), a first SLIC (SLIC1), and a second SLIC (SLIC2).

Another rule 156 indicates that a valid configuration for the second SLIC (SLIC 2) is to be absent; that is, a valid SPE configuration can lack a second SLIC. Yet another rule 158 indicates that another valid configuration for a second SLIC has a Fibre Channel chip (FC), a USB chip (USB), and an I2C chip (I2C). Brackets surrounding a logical device identified in a rule signify that this logical device does not contain any other logical devices—it corresponds directly to a physical hardware device. In rule 158, each of the FC, USB, and I2C chips is in brackets.

Rules 160 and 162 define valid configurations for a valid first SLIC in the computer system; the first SLIC can either have a Fibre Channel chip (FC CHIP), a USB chip (USB), and an I2C chip (I2C), or a serial attached SCSI (SAS) chip, a USB chip and an I2C chip. Because there is no rule allowing SLIC1 to be absent (i.e., SLIC->0), a valid SPE configuration requires a SPA configuration with at least one SLIC. Rules 164 and 166 provide two valid configurations for memory (MEM), either 1 GB RAM or 2 GB RAM, and rules 168, 170, and 172 provide three valid configurations for the CPU, BRAND A, BRAND B, or BRAND C.

In the process of identifying logical devices during the construction of the logical plane, the operating system may determine that the CPU in the computer system was of BRAND D, that is, of a different type than specified in the rules. Although this type of CPU may function properly in the SPE, it is not an expected type of CPU (according to the set of rules 30). Hence, the policy flags the configuration of the computer system as invalid.

The rules of a policy can also include addresses. For example, rule 158 defines a SLIC2 logical device as having a Fibre Channel chip (FC CHIP), a USB device (USB), and an I2C device (I2C). As shown below, this rule can specify the addresses at which each chip or device should be located in order for this definition of SLIC2 logical device to be satisfied: SLIC2->FC (@ address A), USB (@address B), I2C (@address C).

If the logical plane constructor finds each of these three physical devices in the computer system, but not at their specified addresses, than an invalid configuration may have been discovered (depending upon whether the discovered configuration satisfies another rule in the policy).

Rules can have associated match values. Conceivably, the configuration of a computer system can satisfy the terms of multiple rules. Match values determine which rule governs. For example, consider that the rule SLIC2->FC (@address A), USB (@address B), I2C (@address C) has a match value of 100, and another rule SLIC2->FC, USB, I2C has a match value of 50. In this example, rules of greater match value are selected over those rules of lesser match value. It is to be understood that different criteria can be used to rank rules (e.g., the lesser match value is preferred to the greater match value). If the logical plane constructor finds an FC, a USB, and an I2C device, then both SLIC2 rules are satisfied. If each device is at its specified address, then the logical plane constructor selects the more specific of the two rules because that rule has the greater match value. If the device addresses do not match, then the less specific rule is selected (because it is the only one of the two rules that is satisfied by the found physical devices).

The use of less specific rules builds flexibility into the diagnostics system. Consider, for example, that a new SLIC device appears, having FC, USB, and I2C chips, but at new addresses currently unsupported in the set of rules. Although the new SLIC will not satisfy the more specific rule, the set of rules does not have to change; the less specific rule provides a match and enables construction of a logical device for this new SLIC. In addition, although the type of SLIC may be new, if the underlying physical devices are previously known and supported (i.e., the FC, USB, and I2C chips), then program code for a new SLIC logical device or new translators need not be written.

Figure 11:
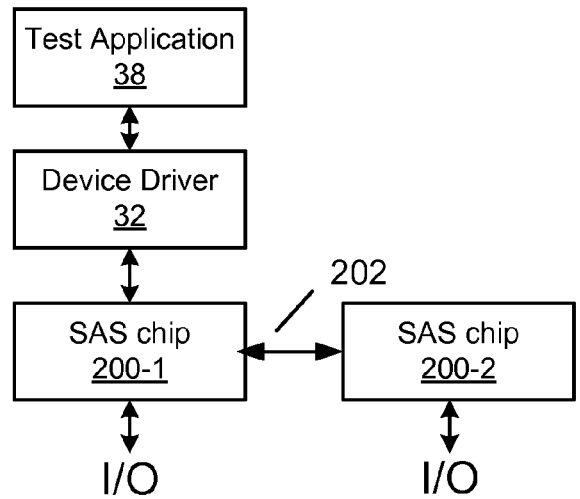
FIG. 11 is diagram of an I/O module and a prior art system for performing diagnostics on the I/O module.

FIG. 11 shows a prior art system for performing diagnostics on a computer system having two SAS chips 200-1, 200-2 organized such that one SAS chip 200-1 is directly accessible and a second SAS chip 200-2 is accessible only through the first SAS chip 200-1 over a dedicated communication path 202. In a conventional diagnostics system, to test this particular arrangement of physical devices, a test application 38 communicates with the first SAS chip 200-1 through a device driver 32. To test the second SAS chip 200-2, the test application 38 communicates through the same device driver 32. The delineation between the testing of the first SAS chip 200-1 and the second SAS chip 200-2 is obscure.

Figure 12:
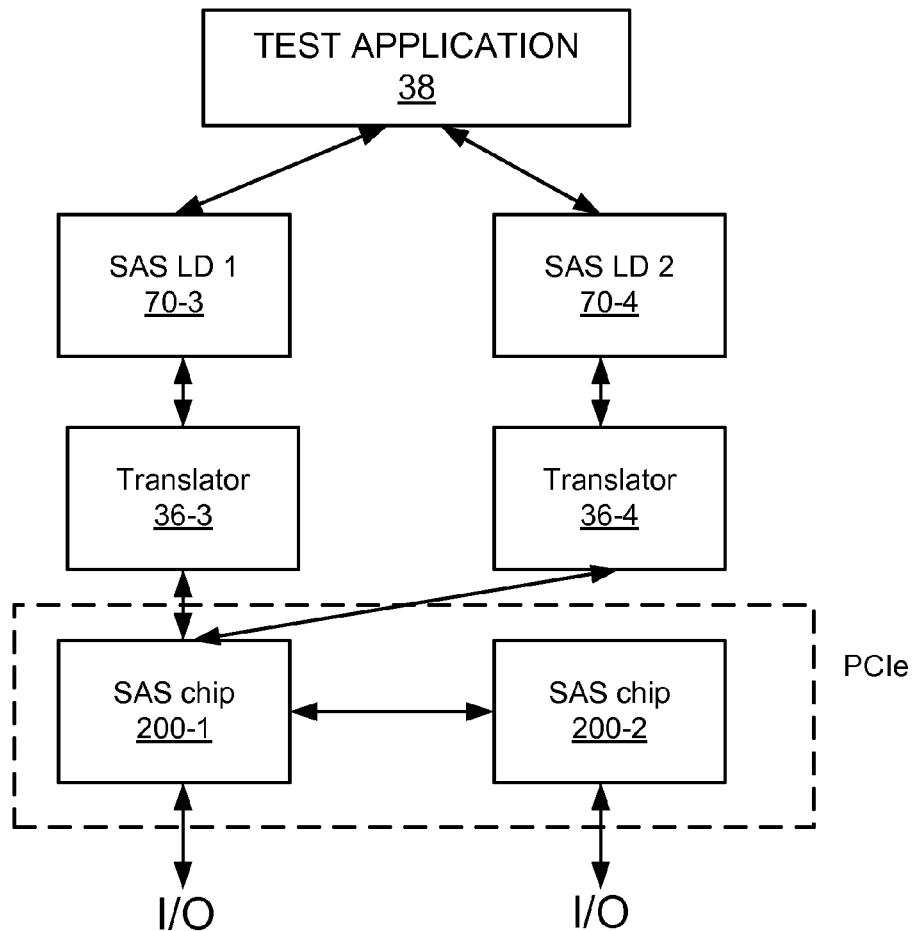
FIG. 12 is diagram of the I/O module of FIG. 10 and corresponding logical devices used for performing diagnostics on the I/O module.

FIG. 12 shows a diagnostics system embodying the present invention, wherein each SAS chip 200-1, 200-2 of FIG. 11 is represented by a different logical device. Logical device 70-3 corresponds to the first SAS chip 200-1, and logical device 70-4 corresponds to the second SAS chip 200-2. A test application 38 can test each SAS chip independently, directing function calls to the functional interface 90 of logical device 70-3 when testing the first SAS chip 200-1 and directing function calls to the functional interface 90 of the logical device 70-4 when testing the second SAS chip 200-2. That the second SAS chip 200-2 cannot be accessed directly has not changed from FIG. 11, although from the perspective of the test application, the second SAS chip 200-2 appears to be a separately directly testable physical device. As a further advantage, the logical topology having the two SAS logical devices more closely resembles a human understanding of the computer system than does the actual physical arrangement.

Because both logical devices 70-3, 70-4 are SAS logical devices, the functional interfaces 90 of both logical devices 70-3, 70-4 can be the same, thus illustrating the reusability of program code made possible by the generation of logical devices. The difference in testing is achieved by employing different translators. The translator interface 96 of the logical device 70-3 communicates with the first translator 36-3 and the translator interface 96 of the logical device 70-4 communicates with the second translator 36-4. The bus-class interfaces 102 of both translators 36-3, 36-4 communicate with the first SAS chip 200-1. The functions of the translator 36-3 are tailored to exercising the first SAS chip 200-1; whereas the functions of the translator 36-4 are tailored to exercising the second SAS chip 200-2, through the first SAS chip 200-1.

Aspects of the present invention may be embodied as a system, method, and computer program product. Thus, aspects of the present invention may be embodied entirely in hardware, entirely in software (including, but not limited to, firmware, program code, resident software, microcode), or in a combination of hardware and software. All such embodiments may generally be referred to herein as a circuit, a module, or a system. In addition, aspects of the present invention may be in the form of a computer program product embodied in one or more computer readable media having computer readable program code embodied thereon.

The computer readable medium may be a computer readable storage medium, examples of which include, but are not limited to, an electronic, magnetic, optical, electromagnetic, infrared, or semiconductor system, apparatus, or device, or any suitable combination thereof. As used herein, a computer readable storage medium may be any tangible medium that can contain or store a program for use by or in connection with an instruction execution system, apparatus, device, computer, computing system, computer system, or any programmable machine or device that inputs, processes, and outputs instructions, commands, or data. A non-exhaustive list of specific examples of a computer readable storage medium include an electrical connection having one or more wires, a portable computer diskette, a floppy disk, a hard disk, a random access memory (RAM), a read-only memory (ROM), a USB flash drive, an non-volatile RAM (NVRAM or NOVRAM), an erasable programmable read-only memory (EPROM or Flash memory), a flash memory card, an electrically erasable programmable read-only memory (EEPROM), an optical fiber, a portable compact disc read-only memory (CD-ROM), a DVD-ROM, an optical storage device, a magnetic storage device, or any suitable combination thereof.

Program code may be embodied as computer-readable instructions stored on or in a computer readable storage medium as, for example, source code, object code, interpretive code, executable code, or combinations thereof. Any standard or proprietary, programming or interpretive language can be used to produce the computer-executable instructions. Examples of such languages include C, C++, Pascal, JAVA, BASIC, Smalltalk, Visual Basic, and Visual C++.

Transmission of program code embodied on a computer readable medium can occur using any appropriate medium including, but not limited to, wireless, wired, optical fiber cable, radio frequency (RF), or any suitable combination thereof.

The program code may execute entirely on a user's computer, partly on the user's computer, as a stand-alone software package, partly on the user's computer and partly on a remote computer or entirely on a remote computer or server. Any such remote computer may be connected to the user's computer through any type of network, including a local area network (LAN) or a wide area network (WAN), or the connection may be made to an external computer (for example, through the Internet using an Internet Service Provider).

While the invention has been shown and described with reference to specific preferred embodiments, it should be understood by those skilled in the art that various changes in form and detail may be made therein without departing from the spirit and scope of the invention as defined by the following claims. For example, although described herein in connection with diagnostic and test applications, it is to be understood that the principles of the invention can extend to other types of application programs.

What is claimed is:

1. A method for performing diagnostics on a computer system having a plurality of physical hardware devices, the method comprising:
    associating a plurality of logical devices with the plurality of physical hardware devices of the computer system;
    providing each logical device with a programmatic interface that abstractly reproduces a functionality of the associated physical hardware device represented by the logical device and insulates the logical device from device-specific particulars needed to communicate with the physical hardware device;
    associating each logical device with a translator that is capable of communicating with the physical hardware device associated with the logical device using the device-specific particulars needed to communicate with the physical hardware device;
    providing a set of rules that define the plurality of logical devices;
    associating each rule with a match value to rank the rules and determine a governing rule;
    receiving, from an application program, a call to the programmatic interface of a given logical device of the plurality of logical devices;
    issuing, by the given logical device in response to the call from the application program, a request to the translator associated with the given logical device, to acquire a specific service that the translator associated with the given logical device is adapted to acquire from the physical hardware device associated with the given logical device; and
    controlling, by the translator associated with the given logical device in response to the request from the given logical device, the physical hardware device associated with the given logical device, so that the physical hardware device associated with the given logical device performs the specific service.

2. The method of claim 1, wherein each translator is adapted to acquire only one specific service from the physical hardware device associated with the logical device.

3. The method of claim 1, further comprising:
    aggregating a plurality of logical devices into a group;
    representing the group of logical devices as another logical device; and
    providing the logical device representing the group of logical devices with a programmatic interface that abstractly reproduces a functionality of the group of logical devices combined with a functionality of each physical hardware device associated with the logical devices in the group of logical devices and insulates the logical device representing the group of logical devices from device-specific particulars needed to communicate with each physical hardware device associated with the logical devices in the group of logical devices.

4. The method of claim 1, further comprising:
    discovering a plurality of physical hardware devices in the computer system;
    defining the logical devices in accordance with the rules; and
    identifying each logical device associated with the computer system based on the physical hardware devices discovered in the computer system and the rules.

5. The method of claim 4, further comprising determining that the computer system has an invalid configuration based on those logical devices identified as associated with the computer system in accordance with the set of rules.

6. The method of claim 1, further comprising:
satisfying the match values of two or more rules in the set of rules to define each logical device; and
selecting one of the satisfied rules as the governing rule associated with each logical device based on the match values of the satisfied rules.

7. A computer system comprising:
a plurality of physical hardware devices;
a computer readable storage medium storing computer readable program code for performing diagnostics on the computer system;
a processor executing the computer readable program code to:
associate a plurality of logical devices with the plurality of physical hardware devices of the computer system;
provide each logical device with a programmatic interface that abstractly reproduces a functionality of the associated physical hardware device represented by the logical device and insulates the logical device from device-specific particulars needed to communicate with the physical hardware device;
associate each logical device with a translator that is capable of communicating with the physical hardware device associated with the logical device using the device-specific particulars needed to communicate with the physical hardware device;
provide a set of rules that define the plurality of logical devices;
associate each rule with a match value to rank the rules and determine a governing rule
receive, from an application program, a call to the programmatic interface of a given logical device of the plurality of logical devices;
issue, by the given logical device in response to the call, a request to the translator associated with the given logical device, to acquire a specific service that the translator associated with the given logical device is adapted to acquire from the physical hardware device associated with the given logical device; and
control, by the translator associated with the given logical device in response to the request from the given logical device, the physical hardware device associated with the given logical device, so that the physical hardware device associated with the given logical device performs the specific service.

8. The computer system of claim 7, wherein each translator is adapted to acquire only one specific service from the physical hardware device associated with the logical device.

9. The computer system of claim 7, wherein the processor further executes the computer readable program code to:
aggregate a plurality of logical devices into a group;
represent the group of logical devices as another logical device; and
provide the logical device representing the group of logical devices with a programmatic interface that abstractly reproduces a functionality of the group of logical devices combined with a functionality of each physical hardware device associated with the logical devices in the group of logical devices and insulates the logical device representing the group of logical devices from device-specific particulars needed to communicate with each physical hardware device associated with the logical devices in the group of logical devices.

10. The computer system of claim 7, wherein the processor further executes the computer readable program code to:
discover a plurality of physical hardware devices in the computer system;
define the logical devices in accordance with the rules; and
identify each logical device associated with the computer system based on the physical hardware devices discovered in the computer system and the rules.

11. The computer system of claim 7, wherein the processor further executes the computer readable program code to:
satisfy the match values of two or more rules; and
select one of the satisfied rules as the governing rule associated with each logical device based on the match values of the satisfied rules.

12. A computer program product for performing diagnostics on a computer system, the computer program product comprising:
a non-transitory computer readable storage medium having computer readable program code embodied therewith, the computer readable program code comprising:
computer readable program code configured to associate a plurality of logical devices with a plurality of physical hardware devices of the computer system;
computer readable program code configured to provide each logical device with a programmatic interface that abstractly reproduces a functionality of the associated physical hardware device represented by the logical device and insulates the logical device from device-specific particulars needed to communicate with the physical hardware device;
computer readable program code configured to associate each logical device with a translator that is capable of communicating with the physical hardware device associated with the logical device using the device-specific particulars needed to communicate with the physical hardware device;
computer readable program code configured to provide a set of rules that define the plurality of logical devices;
computer readable program code configured to associate each rule with a match value to rank the rules and determine a governing rule;
computer readable program code configured to receive, from an application program, a call to the programmatic interface of a given logical device of the plurality of logical devices;
computer readable program code configured to issue, by the given logical device in response to the call, a request to the translator associated with the given logical device, to acquire a specific service that the translator associated with the given logical device is adapted to acquire from the physical hardware device associated with the given logical device; and
computer readable program code configured to control, by the translator associated with the logical device in response to the request, the physical hardware device associated with the logical device, so that the physical hardware device performs the specific service.

13. The computer program product of claim 12, further comprising:
computer readable program code configured to aggregate a plurality of logical devices into a group;
computer readable program code configured to represent the group of logical devices as another logical device; and
computer readable program code configured to provide the logical device representing the group of logical devices with a programmatic interface that abstractly reproduces a functionality of the group of logical devices combined with a functionality of each physical hardware device associated with the logical devices in the group of logical devices and insulates the logical device representing the group of logical devices from device-specific particulars needed to communicate with each physical hardware device associated with the logical devices in the group of logical devices.

14. The computer program product of claim 12, further comprising:
  computer readable program code configured to discover a plurality of physical hardware devices in the computer system;
  computer readable program code configured to define the logical devices in accordance with the rules; and
  computer readable program code configured to identify each logical device associated with the computer system based on the physical hardware devices discovered in the computer system and the rules.

15. The computer program product of claim 12, further comprising:
  computer readable program code configured to satisfy the match values of two or more rules; and
  computer readable program code configured to select one of the satisfied rules as the governing rule associated with each logical device based on the match values of the satisfied rules.

16. The computer program product of claim 15, further comprising computer readable program code configured to determine that the computer system has an invalid configuration based on those logical devices identified as associated with the computer system in accordance with the set of rules.

17. The computer program product of claim 15, further comprising computer readable program code configured to determine that the computer system has an invalid configuration based on those logical devices identified as associated with the computer system in accordance with the set of rules.

18. A method for performing diagnostics on a computer system having a plurality of physical hardware devices, the method comprising:
  generating a physical device tree comprised of physical hardware devices known within the computer system;
  defining logical devices based on the physical device tree and in accordance with a predefined set of rules, each logical device representing one or more of the physical hardware devices;
  associating each logical device with at least one translator that provides a functionality of that logical device and communicates with a given physical hardware device represented by that logical device; and
  testing each physical hardware device by submitting function calls to each logical device representing that physical hardware device and by each logical device calling the at least one translator associated with that logical device in response to the submitted function calls in order to communicate with that physical hardware device.

* * * * *